United States Patent [19]

Dew

[11] E Re. 30,437

[45] Reissued Nov. 18, 1980

[54] CORNER ASSEMBLY FOR FIREPLACE ENCLOSURE

[75] Inventor: Robert C. Dew, New Albany, Ind.

[73] Assignee: S & T Industries, Inc., Louisville, Ky.

[21] Appl. No.: 966,475

[22] Filed: Dec. 4, 1978

Related U.S. Patent Documents

Reissue of:

[64] Patent No.: 3,995,612
Issued: Dec. 7, 1976
Appl. No.: 585,474
Filed: Jun. 10, 1975

[51] Int. Cl.[3] ..... F24C 15/04

[52] U.S. Cl. ..... 126/139; 126/202

[58] Field of Search ..... 126/138, 139, 140, 202

[56] References Cited

U.S. PATENT DOCUMENTS

| | | | |
|---|---|---|---|
| 3,459,173 | 8/1969 | Lydle | 126/202 |
| 3,517,660 | 6/1970 | Springer et al. | 126/139 |
| 3,870,032 | 3/1975 | Lydle | 126/202 |
| 3,913,558 | 10/1975 | Caldwell | 126/139 |

*Primary Examiner*—James C. Yeung
*Assistant Examiner*—Larry Jones
*Attorney, Agent, or Firm*—Maurice L. Miller, Jr.

[57] ABSTRACT

A plate-like corner bracket extends alongside end portions of adjacent horizontal and vertical panels which surround a fireplace outwardly of the opening therefor. Improved means secures the corner bracket to end portions of adjacent panels to connect adjacent panels to each other and adjustable retaining means on the corner bracket carries an adjustable projecting member which engages an inner portion of the fireplace opening.

8 Claims, 5 Drawing Figures

CORNER ASSEMBLY FOR FIREPLACE ENCLOSURE

Matter enclosed in heavy brackets [ ] appears in the original patent but forms no part of this reissue specification; matter printed in italics indicates the additions made by reissue.

BACKGROUND OF THE INVENTION

This invention relates to a corner assembly for a fireplace enclosure and more particularly to such an enclosure which is adapted to carry mesh curtains, glass doors and the like.

Heretofore in the art to which my invention relates, difficulties have been encountered in packaging and shipping fireplace enclosures disassembled due to the fact that it is difficult for the ultimate user to assemble and install the unit within the fireplace. This is especially true in view of the fact that fireplace enclosures, such as glass enclosures, consists of many components which must be assembled to accommodate fireplaces of various sizes and at the same time must be firmly anchored within the fireplace opening with the frame assembly for the enclosure extending along the outside of the fireplace opening.

SUMMARY OF THE INVENTION

In accordance with my invention, I provide a fireplace enclosure having improved corner brackets which extend alongside end portions of adjacent horizontal and vertical panels which surround the fireplace outwardly of the opening therefor. The corner bracket is secured to one of the adjacent panels by off-set tab-like members which engage passageways provided through an end portion of one of the adjacent panels. An adjustable retaining member is carried by the plate-like corner bracket and an adjustable projecting member is carried by the retaining member in position to engage an inner portion of the fireplace opening whereby the fireplace enclosure is secured in place.

DESCRIPTION OF THE DRAWING

Apparatus embodying features of my invention is illustrated in the accompanying drawing, forming a part of this application, in which.

DETAILED DESCRIPTION

Figure 1:
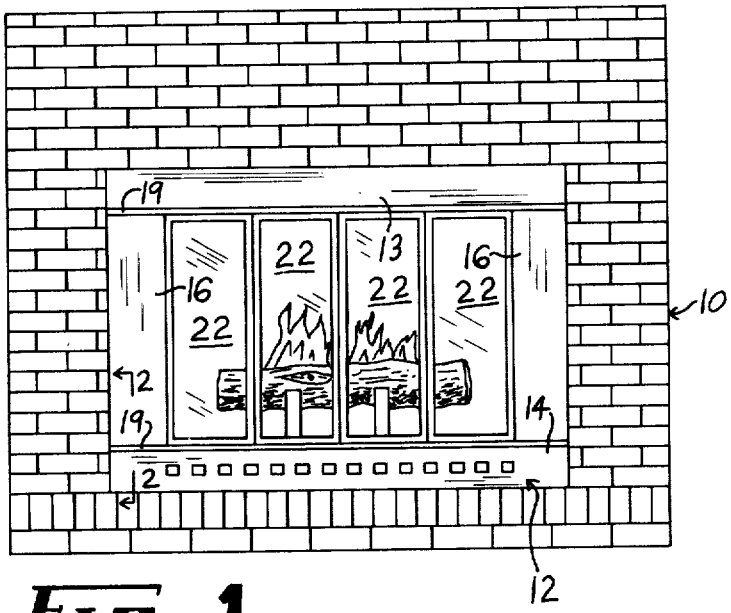
FIG. 1 is a front elevational view showing a fireplace enclosure secured in place in accordance with my invention.
Figure 2:
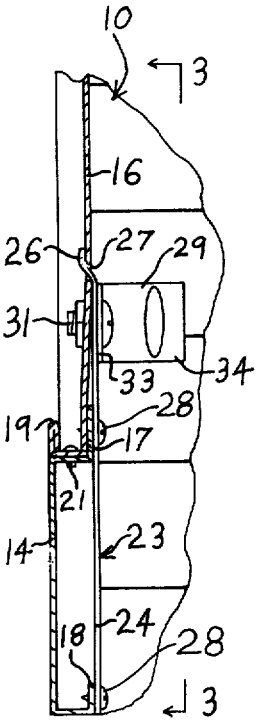
FIG. 2 is an enlarged sectional view taken generally along the line 2—2 of FIG. 1.
Figure 4:
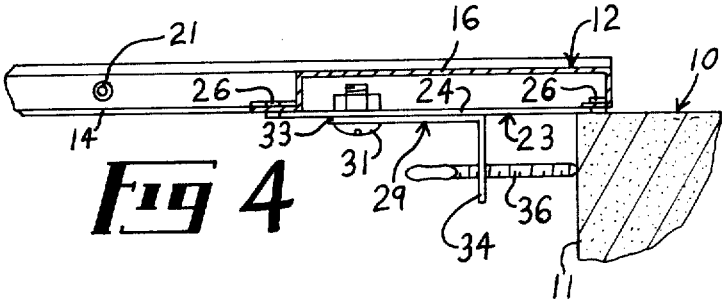
FIG. 4 is an enlarged fragmental, sectional view taken generally along the line 4—4 of FIG. 3 showing the manner in which the enclosure is secured in place within the fireplace opening.

Referring now to the drawing for a better understanding of my invention, I show a fireplace 10 having an opening 11 therein. As shown in FIGS. 1 and 4, my improved fireplace enclosure, indicated at 12, is adapted to surround the fireplace 10 outwardly of the opening 11 with the means for attaching the enclosure to the fireplace being positioned inwardly of the opening 11. The enclosure 12 comprises a horizontal top panel 13, a horizontal bottom panel 14 and vertical side panels 16 which extend between end portions of the top and bottom panels. The top panel 13 and the bottom panel 14 are generally channel-shaped, as shown in FIG. 2, and are provided with vertically extending flange members 17 and 18 at the inner side thereof. Horizontal door angles 19 are secured to the top panel 13 and bottom panel 14 by suitable retaining elements 21, as shown in FIG. 2. Glass door panels 22 are mounted within the enclosure 12 by suitable means whereby the door panels may be opened and closed in the usual manner. In view of the fact that the construction and operation of the door panels 22 are well known in the art to which my invention relates, no further description thereof is deemed necessary.

The lower end of each vertical panel 16 is secured to the adjacent end of the bottom panel 14 by my improved corner bracket 23. Also, the upper end of each vertical panel 16 is connected to the adjacent end of the top panel 13 by my corner bracket 23. Each corner bracket 23 comprises a plate-like member 24 having laterally offset tab-like members 26 at one edge thereof disposed to pass through slots or passageways 27 provided in the adjacent portion of a vertical side panel 16, as shown in FIG. 2. It will be understood that the tab-like members 26 on the lower corner brackets 23 project from the upper edge thereof while the tab-like members 26 carried by the upper corner brackets 23 project downwardly and engage the openings 27 provided in upper portions of the vertical side panels 16. In view of the fact that construction and operation of each of the four corner brackets 23 for the enclosure 12 is identical, only one such corner bracket is shown and described. With the corner bracket 23 thus attached to the adjacent end portion of the vertical panel 16, the corner bracket 23 is attached to the bottom panel 14 or top panel 13, as the case may be, by suitable retaining screws 28 which pass through the plate-like member 24 and the flanges 17 and 18, as shown.

Figure 5:
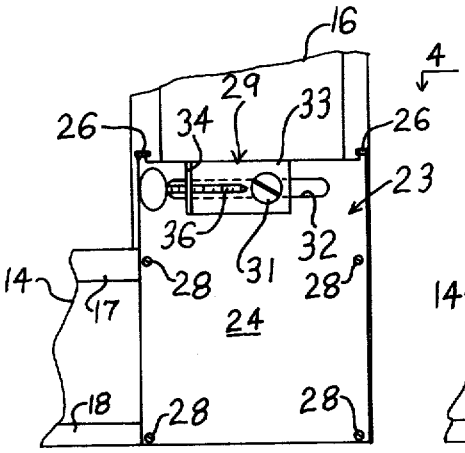
FIG. 5 is a view corresponding to FIG. 3 showing the L-shaped bracket of the adjustable retaining member rotated an angular distance of 180° to position the laterally projecting leg of the L-shaped bracket at a different position from that shown in FIG. 3, thus adapting the corner bracket for use with a smaller size fireplace opening.
Figure 3:
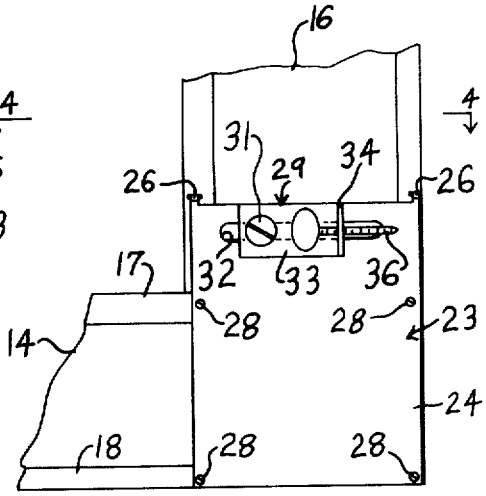
FIG. 3 is a fragmental view taken generally along the line 3—3 of FIG. 2, drawn to a smaller scale and removed from the fireplace.

An adjustable retaining member in the form of a generally L-shaped bracket 29 is detachably connected to the plate-like member 24 by a suitable retaining bolt 31 which passes through a suitable opening in the bracket 29 and an elongated, horizontally extending opening 32 provided in the plate-like member 24. The L-shaped bracket 29 is provided with a leg 33 which extends alongside and parallel to the plate-like member 24. The other leg 34 of the L-shaped bracket 29 extends laterally in a direction generally perpendicular to the plate-like member 24 whereby it extends generally parallel to the inner surface of the opening 11 of the fireplace 10, as shown in FIG. 4. An elongated threaded member 36 is in threaded engagement with a threaded opening through the leg 34 and extends generally perpendicular to the leg 34 and the inner surface of the opening 11 whereby it is in position to engage the inner surface of the opening 11 to thus secure the enclosure 12 in place.

Where the fireplace enclosure 12 is to be installed on fireplaces having smaller openings, the L-shaped bracket 29 is rotated to the position shown in FIG. 5 and is then locked in place by the retaining bolt 31 to thus position the leg 34 inwardly of the position shown in FIG. 3. Where it is necessary to rotate the bracket 29 180° to the position shown in FIG. 5, the elongated threaded member 36, such as a thumb screw, is removed from the threaded opening in the leg 34 and reinserted in the opposite side of the threaded opening whereby the elongated threaded member 36 extends toward the outer edge of the enclosure 12, as shown in FIG. 5.

From the foregoing description, the operation of my improved fireplace enclosure will be readily understood. The adjustable retaining brackets 29 are attached to the plate-like members 24 by the retaining bolts 31 whereby each bracket 29 may slide relative to the plate-like member 24. The corner brackets 23 are then attached to adjacent portions of the vertical panels by inserting the tab-like members 26 of each corner bracket 23 through the passageways 27 in the adjacent end portion of a vertical panel 16, as shown in FIG. 2. With the plate-like member 24 thus secured to the vertical panel, the plate-like member 24 is then attached to the bottom panel 14 or top panel 13, as the case may be, by the retaining screws 28 whereby adjacent ends of the vertical and horizontal panels are secured rigidly to each other.

With the corner brackets 23 thus secured in place, the width of the opening 11 in the fireplace 10 is obtained and each lower L-shaped bracket 29 is adjusted to position the legs 34 thereof in spaced relation approximately the width of the fireplace opening 11 less one inch. In like manner, the L-shaped brackets 29 at the upper portion of the enclosure 12 are adjusted to position their legs 34 from each other a distance equal approximately the width of the fireplace opening 11 less one inch. The retaining bolts 31 are then secured in place whereby the lateral legs 34 are adapted to pass inwardly of the fireplace opening 11. That is, the enclosure 12 is positioned relative to the fireplace, as shown in FIGS. 1 and 4, whereby the lateral legs 34 extend inwardly of and in spaced relation to the adjacent surface of the opening 11. The top panel 13, bottom panel 14 and side panels 16 extend alongside and outwardly of the fireplace openings 11, as shown in FIG. 4. With the enclosure 12 thus positioned, the threaded thumb screws 36 are rotated to move the same outwardly into engagement with the adjacent surface of the fireplace opening 11 whereby the entire enclosure 12 is secured rigidly in place.

In the event the fireplace opening 11 is too small to accommodate the lateral leg 34 and the threaded screw 36, the L-shaped bracket 29 is rotated an angular distance of 180°, as shown in FIG. 5, whereby the lateral leg 34 is positioned a further distance inwardly of the fireplace opening 11. The L-shaped brackets 29 are then adjusted, as described hereinabove, to position the horizontally aligned legs 34 a distance from each other approximately the width of the fireplace opening 11 less one inch, whereby the lateral legs 34 are then free to move inwardly of the fireplace opening 11.

From the foregoing, it will be seen that I have devised an improved fireplace enclosure for supporting screens, glass panels and the like. By providing corner brackets which may be quickly and easily secured to the adjacent ends of adjacent horizontal and vertical panels, together with the adjustable means for positioning the retaining screws 36 inwardly of the fireplace opening 11, I greatly facilitate the installation of the enclosure and at the same time provide a rigid structure which is firmly anchored to the fireplace structure. Also, by providing adjustable means for accommodating fireplace openings of different sizes, the retaining unit may be constructed of one size and still accommodate various size fireplace openings. Furthermore, by providing the L-shaped retaining member 29 which is adapted to move an angular distance of 180°, the lateral leg thereof may be positioned still further inwardly of the fireplace opening 11 to accommodate smaller openings. Furthermore, by providing the laterally offset tab-like members in the corner bracket which engage one of the adjacent panel members, the corner bracket is held in place and in proper alignment with the other adjacent panel member whereby the retaining screws 28 may be readily installed to thus secure the adjacent panels rigidly to each other without having to actually hold the adjacent ends of adjacent panel members in proper relationship to each other. That is, the tab-like members attach the corner bracket to one panel member by merely inserting the tab-like members in the openings therefor whereby the corner bracket is then secured to the other panel member by merely moving the other panel member into proper alignment with the corner bracket.

While I have shown my invention in two forms, it will be obvious to those skilled in the art that it is not so limited, but is susceptible of various other changes and modifications without departing from the spirit thereof.

What I claim is:

1. In a fireplace enclosure disposed to surround a fireplace outwardly of the opening therefor and having horizontal top and bottom panels and vertical side panels, the improvement comprising:

a. a plate-like corner bracket extending alongside end portions of adjacent horizontal and vertical panels, b. at least one laterally offset tab-like member carried by an edge of said plate-like corner bracket and there being a passageway through an end portion of one of said adjacent panels in position to receive said tab-like member whereby said corner bracket is secured to said one of said adjacent panels, c. additional means securing said plate-like corner bracket to said end portion of the other of said adjacent panels so that said end portions of adjacent panels are secured to each other, and d. an adjustable retaining member carried by said plate-like corner bracket and having an adjustable projecting member disposed to engage an inner portion of the fireplace opening.

2. A fireplace enclosure as defined in claim 1 in which said corner bracket is secured to the other of said adjacent panels by retaining screws.

3. In a fireplace enclosure disposed to surround a fireplace outwardly of the opening therefor and having horizontal top and bottom panels and vertical side panels, the improvement comprising:

a. a plate-like corner bracket extending alongside end portions of adjacent horizontal and vertical panels, b. means securing said plate-like corner bracket to said end portions of adjacent panels so that said end portions of adjacent panels are secured to each other, c. a generally L-shaped bracket having one leg thereof extending alongside said plate-like corner bracket with the other leg thereof extending generally perpendicular to said plate-like corner bracket and carrying an adjustable projecting member disposed to engage an inner portion of the fireplace opening, d. there being aligned openings through said one leg of said L-shaped bracket and said plate-like corner bracket with at least one of said openings being elongated in a horizontal direction, and e. a retaining member extending through said aligned openings for detachably securing said L-shaped bracket to said plate-like member at selected positions.

4. A fireplace enclosure as defined in claim 3 in which said adjustable projecting member is an elongated threaded member in threaded engagement with a threaded opening through said other leg of said L-shaped bracket.

5. A fireplace enclosure as defined in claim 3 in which said one leg of said L-shaped bracket is pivotally mounted for angular movement to selected positions 180° from each other so that said other leg of said L-shaped bracket is retained selectively at different positions relative to said inner portion of the fireplace opening.

*6. In a fireplace enclosure disposed to surround a fireplace outwardly of the opening therefor and having horizontal top and bottom panels and vertical side panels, the improvement comprising:*

*a. a plate-like corner bracket extending alongside end portions of adjacent horizontal and vertical panels,*

*b. means securing said plate-like corner bracket to said end portions of adjacent panels so that said end portions of adjacent panels are secured to each other, and*

*c. an adjustable retaining member carried by said plate-like corner bracket and having an adjustable projecting member disposed to engage an inner portion of the fireplace opening.*

*7. The improved fireplace enclosure of claim 6 wherein said adjustable retaining member comprises a generally L-shaped bracket having one leg thereof extending alongside said plate-like corner bracket with the other leg thereof extending generally perpendicular to said plate-like corner bracket, said other leg carrying an adjustable projecting member disposed to engage an inner portion of the fireplace opening.*

*8. The improved fireplace enclosure of claim 7 wherein said one leg of said L-shaped bracket and said plate-like corner bracket each define alignable openings for insertion of a retaining member therethrough for detachably securing said L-shaped bracket to said plate-like member at selected horizontally aligned positions.*

* * * * *